United States Patent [19]

Reimers et al.

[11] 4,309,644
[45] Jan. 5, 1982

[54] ELECTRIC VEHICLE CONTROLLER ADAPTED FOR CHARGE STATION CONNECTION

[76] Inventors: Eberhart Reimers, 8807 Strause Ct., Springfield, Va. 22153; Elmo E. Moyer, 7 Fenlon St. West, Saratoga Springs, N.Y. 12866

[21] Appl. No.: 146,874
[22] Filed: May 5, 1980
[51] Int. Cl.³ .............................................. H02P 1/00
[52] U.S. Cl. ................................. 318/139; 318/251; 318/353; 320/2; 320/3; 320/4
[58] Field of Search ..................... 318/139, 251, 353; 320/2–4, 15, 8, 17, 19

[56] References Cited
U.S. PATENT DOCUMENTS

| | | | |
|---|---|---|---|
| 3,586,954 | 6/1971 | Carves | 320/2 |
| 3,809,978 | 5/1974 | Zubris | 318/139 |
| 3,983,462 | 9/1976 | Jones | 318/139 |
| 4,127,803 | 11/1978 | Etienne | 320/2 |
| 4,161,682 | 7/1979 | Corvette | 320/2 |

*Primary Examiner*—Ulysses Weldon
*Attorney, Agent, or Firm*—Nathan Edelberg; Robert P. Gibson

[57] ABSTRACT

An on-board quick charge circuit for an electric vehicle battery is incorporated in an electric vehicle having a solid state dc chopper motor speed controller which may be connected in either a propulsion mode or in a battery charge mode. With the aid of an external donor battery at the charge station, load leveling at the utility grid is maintained irrespective of the instantaneous current demands in the battery charging process. Energy transfer from the donor battery to the on-board propulsion battery is controlled by solid state switching apparatus. Each time the switching apparatus conducts, energy as transferred from the donor battery to the on-board propulsion battery, and energy is additionally transferred and stored in the dc reactor associated with the dc chopper circuit of the vehicle propulsion system. The energy stored in the dc reactor is expended into the on-board propulsion battery when the switching apparatus is turned off. Thus, the on-board propulsion battery is recharged by a continuous dc current amplitude.

5 Claims, 3 Drawing Figures

ELECTRIC VEHICLE CONTROLLER ADAPTED FOR CHARGE STATION CONNECTION

The invention described herein may be manufactured, used, and licensed by or for the Government for Governmental purposes without the payment to me of any royalties thereon.

BACKGROUND OF THE INVENTION

This invention relates to charging systems for electric vehicle batteries, and more particularly, to a load leveling quick charge system using a donor battery.

The energy crisis has renewed interest in electric vehicles. In the not too distant future, the use of electric vehicles for urban transportation purposes may increase rather rapidly, particularly if gasoline prices continue to increase.

The battery of an electric vehicle must, of course, be kept charged. These batteries are now generally charged by a battery charger which is powered by the local utility grid. If large numbers of electric vehicles are used in a given region, charging of the batteries of these vehicles by chargers powered by the local utility grid could significantly alter the energy distribution within a utility grid. In fact, peak power demand in a neighborhood having a large number of electric vehicles could potentially outstrip the peak power demand for airconditioners currently experienced in many single family residence neighborhoods and make the relatively quick recharge of propulsion batteries requiring a deep recharge virtually impossible.

This invention provides a battery charging system intended for use with a higher voltage donor battery as the charge station. The system affords as a load leveler advantage for the utility power grid. With the unique vehicle controller of this invention, an electric vehicle propulsion battery requiring a deep recharge may be quickly and fully recharged.

SUMMARY OF THE INVENTION

The concept of this invention includes recognition of the facts (1) that an electric vehicle propulsion battery must be rechargeable to approximately 80% of its capacity within a short period of time to maintain an economically acceptable performance level in local daily commuter operation, and (2) that a local transportation system based on daily use of electric vehicles, needs battery charger stations with inherent load leveling characteristics in order to eliminate peak loading of the utility power grid. The electric vehicle propulsion battery charging system of this invention involves a relatively high voltage donor battery at the charger station. The donor battery is not continuously utilized and thus affords a load leveling advantage which reduces the peak loading of the utility grid when a significant number of electric vehicle propulsion batteries are recharged simultaneously. Although the unique controller permits charging directly from the utility grid, if necessary, it is believed that the omission of a higher voltage donor battery from the charging station, which could result in shortage of peak energy, may adversely limit the available charge current amplitude.

In accordance with this invention, the transfer of energy from the donor battery to the electric vehicle (EV) propulsion battery is attained by a solid state switching means which is alternately turned on and off. When the switching means is on, energy is transferred from the donor battery to the EV-battery, and energy is also stored in a dc reactor. When the switching means is off, the energy stored in the dc reactor is expended into the propulsion battery via a freewheeling diode. The unique on board micro-computer control system of this invention, which normally controls the operation of the electric vehicle, also, during charging, monitors the state of charge of the propulsion battery and controls the rate of charge by control of the conduction duty cycle of the switching means.

BRIEF DESCRIPTION OF THE DRAWINGS

A full and complete understanding of the invention can be obtained from the following detailed description when read in conjunction with the annexed drawing in which.

DETAILED DESCRIPTION OF THE INVENTION

Figure 1:
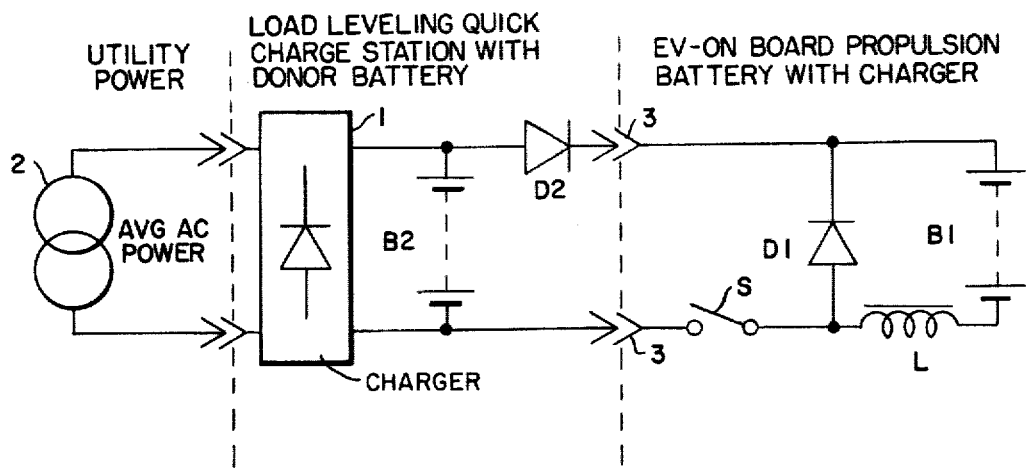
FIG. 1 is a schematic diagram of the general concept of the load leveling quick charge system of this invention.

Referring to FIG. 1, the battery B1 is the propulsion battery of an electric vehicle, the diode D1 is a part of the motor controller of the electric vehicle and the inductance L is a DC reactor which is an integral element of the propulsion system of the electric vehicle. The switching means S, the diode D1, the inductance L and, of course, the battery B1 are on board the electric vehicle.

The Battery charger station of this embodiment includes the diode D2, the donor battery B2, and an AC to DC charger 1 for charging donor battery B2. The charger 1 is powered by the AC utility power 2. Thus, the charger station of this invention comprises the diode D2, the donor battery B2 and the AC to DC charger 1 which is powered by the utility source 2.

The charger station of FIG. 1 is coupled to the electric vehicle for charging propulsion battery B1 by means of the pair of connectors 3. Each of the connectors 3 may comprise a plug and jack type arrangement. The AC to DC charger 1 may be a prior art battery charger.

Referring back to FIG. 1, the switching means S is alternately turned on and off, and when on, energy from donor battery B2 is stored in DC reactor L and in battery B1. When switching means S is turned off, the energy stored in reactor L is now expended into propulsion battery B1 via the freewheeling diode D1. As battery B1 regains its charge by virtue of a continuous but exponentially increasing and decreasing current amplitude, donor battery B2 is gradually depleted by an equal but pulsed energy demand. It will be appreciated that the donor battery B2 can be either buffered by the AC to DC charger 1, or recharged after the charger station is disconnected from the electric vehicle.

Although donor battery B2 has a higher terminal voltage than propulsion battery B1 under all operating conditions, i.e. typically 154 VDC to recharge a 108 VDC onboard battery or wherein the voltage rating of the on-board storage battery is approximately two-thirds of the voltage rating of the charge station storage battery, as will be discussed hereinafter, diode D2 may be adapted to prevent accidental discharge of propulsion battery B1 into donor battery B2 in the event that a failure mode in the charger station should occur.

Figure 2:
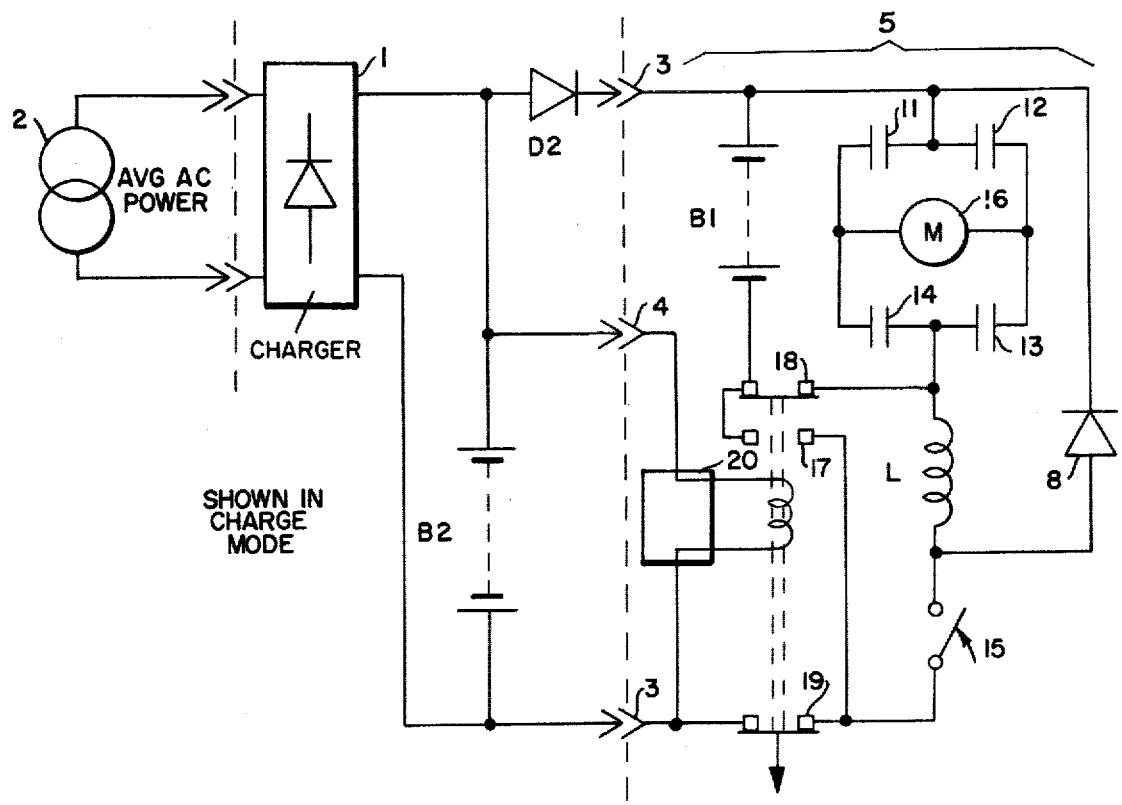
FIG. 2 is a schematic diagram showing a typical charging station and showing a first embodiment of the unique controller of this invention as used to charge the propulsion battery of an electric vehicle.

FIG. 2 shows an electric vehicle DC propulsion system utilizing a DC chopper motor controller adapted in accordance with this invention whereby the DC motor controller may also function as a battery charger with a minimum number of additional components. It will be appreciated that for vehicle propulsion, either pair of the dual acting contactors 11, 13 or 12, 14 of the controller will be closed, dependent upon whether the vehicle is in the forward or in the reverse operating mode. Motor speed is controlled by the control of the conduction duty cycle of switching means 15. Switching means 15 is preferably a solid state (transistor) switching device. It will be appreciated that the conduction duty cycle controls the average voltage amplitude applied across the motor, and thereby controls the speed of the motor. On-board battery B1 is the sole source of energy for both forward and reverse propulsion and is connected across the DC motor M through contacts 17 of the preferably solenoid type switching means 20. It will be recognized that the motor controller shown in FIG. 2 is an industrial motor controller of the type typically used on most electric vehicles. Details of the electric vehicle itself are not shown since persons skilled in the art are fully aware that motor M may be coupled to the mechanical drive system of the vehicle by any suitable known mechanical coupling to propel the vehicle, and that the motor M may be energized by the on-board propulsion battery B1 which typically is a battery containing a large number of cells. The solenoid type switching means 20 of FIG. 2 includes 3 pairs of contacts 17, 18 and 19. Contacts 17 serve to couple the battery B1 in series through the aforesaid switching means 15 across the series field winding L of motor M and in series with the armature 16 of motor M. Contacts 17 are conductive in the vehicle drive mode. It will be appreciated that in the drive mode, the conduction duty cycle of the aforesaid switching means 15 turns the switching means 15 on and off. However, in consideration of the high frequency, typically 400-4000 Hertz, current in armature 16 of the motor M is substantially continuous while current in the switching means 15 and in the inverse bypass diode 8 is pulsating. Of course, the greater the on-time vs off-time of the conduction duty cycle frequency, the higher the average voltage across the motor and the higher the current amplitude or the motor speed—dependent upon loading of the motor. Contacts 18 and 19 of said solenoid type switching means 20, when energized, serve to couple the battery B1 via the series field winding L of motor M in series with the switching means 15 across the pair of charge terminals 3. Contacts 18 and 19 are conductive in the charge mode.

A first pair of contactors 11 and 13 are utilized when the electric vehicle is driven in the forward direction and a second pair of contactors 12 and 14 are utilized when the vehicle is driven in the reverse direction. The switching means 20 is shown energized in the charge mode.

In operation of the embodiment of FIG. 2 in the forward drive mode, thru series field L, with contactors 11 and 13 closed, the current from battery B1 rises exponentially to a finite value in direct response to motor speed and to the on-time of the conduction duty cycle of switching means 15. During the "off-time" or non-conducting period of switching means 15, the stored energy in the inductance of series field L must be expended. Thus, current continues to flow through the armature 16 and the series field winding L in the same direction but exits the field winding L through inverse bypass diode 8. In this way, the energy is expended via the local loop comprising the armature 16 of the motor M and series field winding L. During vehicle propulsion, the instantaneous current demand from battery B1 is identical to the instantaneous current amplitude of the motor for the duration of the conduction period of switching means 15. Thus, battery B1 furnishes pulsating current to motor M to propel the vehicle at all speeds, including full motor speed. It will be appreciated that at full speed, the battery effectively provides continuous DC current since the switching means 15 could be conductive all of the time.

The motor controller circuitry of FIG. 2 provides means for charging battery B1 through the contacts 18, 19 of the switching means 20 and the pair of terminals 3.

When recharging, the on-board propulsion system 5 (FIG. 2) is plugged into the charger station via the pair of terminals 3 and additional terminal 4 connection. At this point, the solenoid of the switching means 20 is activated to make the contacts 18 and 19 conductive. It is understood that the motor contactors 11, 13 and 12, 14 are non-conducting in the charge mode as the motor armature 16 must be disconnected to disable the motor M. With the contacts 18 and 19 of the switching means 20 conducting, the series field winding L and the battery B1 are series connected across the charge station battery B2 through the switching means 15. In the charge mode, both the series field winding L and the switching means 15 perform in the same manner as in the drive mode. The battery B1 is substituted for the motor armature 16 in the series connection, however, and the charge station battery B2 serves as the current source.

Figure 3:
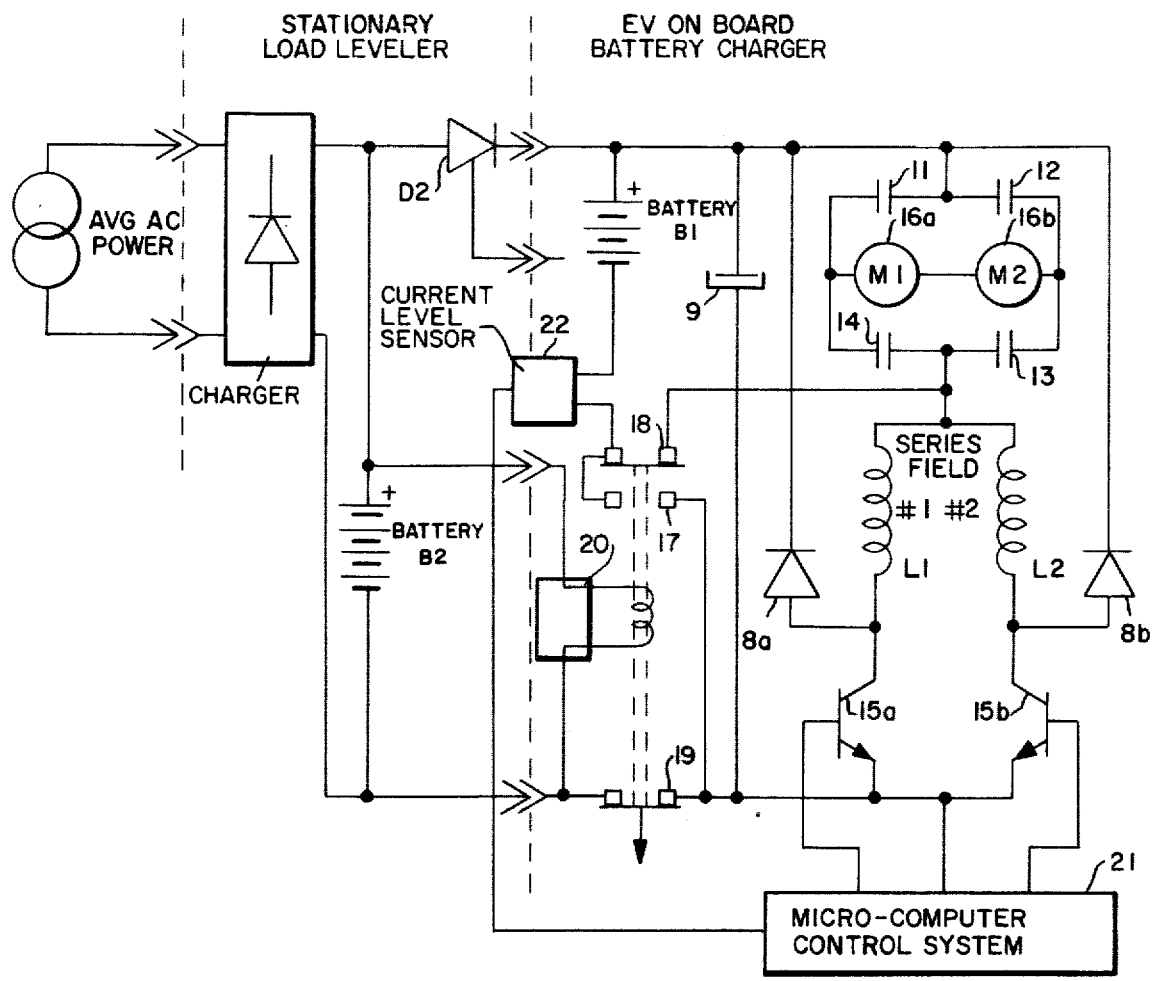
FIG. 3 is a schematic diagram showing a typical charging station and showing a second embodiment of the unique controller of this invention as used to charge the propulsion battery of an electric vehicle incorporating a two phase, sequentially switched dc motor propulsion system.

FIG. 3 shows a practical two phase, sequentially switched DC motor controller adapted in accordance with this invention. This showing depicts an optional computer control feature.

In the embodiment of FIG. 3, the switching means which corresponds to FIG. 2's switching means 15, is a pair of switching transistors 15a and 15b and the series field windings L1 and L2 are the equivalent of DC reactor L of FIG. 1. Likewise, the freewheeling diodes 8a and 8b are the equivalent of diode D1 of FIG. 1.

The basic motor controller of FIG. 3 operates in a manner similar to the manner in which the basic motor controller of FIG. 2 operates. That is, when the vehicle is operated in the forward mode, contactors 11 and 13 are closed (all others open) and transistor switches 15a and 15b each are sequentially turned on and off to supply current pulses to motors M1 and M2 from battery B1. In the reverse mode of operation, contactors 12 and 14 are closed (all others open).

The contribution of this embodiment of the invention to the state-of-the-art is significant in that the controller utilizes two existing, relatively heavy, energy-storing elements, namely, the two series field windings L1 and L2 of motors M1 and M2, within the solid state controller, to facilitate the recharging by an external energy source. This embodiment utilizes the DC series field winding L1 of motor M1, and the DC series field winding L2 of motor M2, and an energy storage capacitor across the battery terminals, the capacitor 9. Transistor switching means 15a and 15b are alternately and in phase sequence turned on and off, such that transistor switching means 15a is the forward conduction state between 0 and $2\pi$ radians, and transistor switching means 15b between $(-)\pi$ and $(+)\pi$ radians. It is self-evident that forward conduction of either transistor switching means 15a and 15b in excess of $\pi$ radians duration will cause overlapping periods of conduction. Thus, the system is capable of providing instantaneous current transformation from the usually high voltage, lower current energy storage battery B1 to the lower voltage, high current sink comprised of the armatures 16a, 16b of the motors M1 and M2. It is readily understood that in a typical electric vehicle controller, each of the sequentially switched transistors 15a and 15b will conduct typically only 50% of the instantaneous armature current, as long as the forward conduction period is balanced for either sequentially switched transistor 15a and 15b at a selected repetition frequency. Each time transistor switching means 15a or 15b is turned off, the stored energy in the respective series fields L1 or L2 is expended through the respective inverse-by-pass diodes 8a or 8b to maintain energy balance in armatures 16a, 16b of motors M1 or M2, regardless of the conduction duty cycle of the switching means 15a and 15b. Since the switching frequency f is relatively very high with respect to the motor time constants, current in the armature will remain relatively constant, whereby its relative ripple amplitude is only ½ of the ripple amplitude in the fields at two times the frequency, whereby the average current (IFM) in either field winding L1 or L2 is always:

$$IFM = 0.5 \ I \ (ARMATURE)$$

If the conduction duty cycle of either transistor switch 15a or 15b is less than 50%, then the DC bus will show a current having a pulse duration of $0 < t < \pi$ at a repetition frequency 2f with an average peak current IPK = ½ I (ARMATURE, motor M1, M2). Whenever the conduction period of transistor switching means 15a and 15b each exceed $\pi$ radians, the DC bus contains DC current whose magnitude is IPK-½ I (ARMATURE motor M1, M2) topped by a pedestal of equal magnitude, whose duration is equal to the overlapping conduction interval between transistor switching means 15a and 15b, i.e.: $\pi < t < 2\pi$ or $0 < t\pi$ at a repetition rate of 2f. Since energy storage capacitor 9 alternately stores or expends this energy, it follows that the battery current demand will be continuous DC current (with a slight ripple). To maintain energy balance, the magnitude of the current IBAT drained from the battery is:

$$IBAT = \left( \frac{E \ ARMATURE \ (M1 + M2) + K1}{E \ BATTERY} \right) I(ARMATURE)[ADC]$$

whereby K1 is a constant which accounts for the average forward voltage drop in the solid state switching means 15a and 15b and the effective voltage drop in the series field winding L1 and L2.

In accordance with this invention, the basic motor controller of FIG. 3, as above described, includes interconnection means to charge battery B1 from an external charge station through diode D2. It will be appreciated that the diode D2, which may be a current limiting unidirectional means, such as a thyristor, may be either a part of the charge station, as shown, or on-board the electric vehicle. When a controlled unidirectional means is embodied, the switching means 20 may include contacts, not shown, and associated circuitry, also not shown, to trigger the diode D2 only when the on-board battery B1 is connected for recharging.

It is noteworthy that this circuit, in either connection mode, is capable of providing true instantaneous current transformation in its energy recovery operational mode from the usually high current, low voltage generator source to the usually high voltage, low current energy storage battery. Since the transistor switches modulate current in two separate energy storage elements, it follows that the sum of the average current amplitude in either transistor switching means 15a and 15b is equal to the total current in the armatures 16a and 16b of motors M1 and M2. It also follows that the pedestal of the current amplitude in the DC bus is equal to 50% of the current amplitude in the armatures 16a and 16b, whereby the pulse repetition rate is two times that of the individual transistor switching means 15a and 15b. The current pulse train in the DC bus is then smoothed by energy storage capacitor filter 9, the third energy storage element, such that battery B1 is solely charged with transformed energy whereby the instantaneous charge current amplitude can be approximated with:

$$IBAT \approx I_{S1} + I_{S2}$$

$I_{S1}$ = INSTANTANEOUS CURRENT IN TRANSISTOR SWITCH 15a $I_{S2}$ = INSTANTANEOUS CURRENT IN TRANSISTOR SWITCH 15b

I ARM = ARMATURE CURRENT

To charge battery B1 in FIG. 3, transistor switching means 15a and 15b are sequentially turned on and off, whereby each respective conduction duty cycle is continuously variable. When switching means 15a is on, energy from donor battery B2 is transferred to the on-board battery B1 and also stored in series field winding L1. When switching means 15a turns off, the energy stored in series field winding L1 is expended into battery B1 through diode 8a. When switching means 15b turns on, energy from donor battery B2 is also transferred to battery B1 through a parallel current path, whereby additional energy is stored in series field winding L2. When transistor switching means 15b is turned off, the energy stored in series field winding L2 is also expended into battery B1 through diode 8b. Effectively, switching means 15a and 15b provide two paralled current loops which charge battery B1 simultaneously and irrespective of the conduction mode of the chopper. Because of the three energy storage elements (L1, L2, 9) the instantaneous current transformation between donor and on-board battery is near absolute. Both batteries are either charged or depleted with DC current containing only a small AC ripple amplitude.

Although not shown in FIG. 2, both the motor controller of FIG. 2 and of FIG. 3 may be controlled by a microcomputer control system as shown in FIG. 3 at 21. In addition to controlling the electric vehicle in a conventional manner, micro-computer control system means may be adapted to control the rate of charge of propulsion battery B1 by donor battery B2 and to continuously monitor the state of charge of battery B1 by means of the current level sensor 22. The micro-computer control system shown at 21 in FIG. 3 can be any one of several suitable Micro-computer available on the market.

Charge Control Methodology

A lead acid battery in a normally discharged state can absorb electrical energy rapidly without over heating or excessive gassing. It has been verified experimentally that the battery can be recharged with an instantaneous current amplitude of magnitude proportional to the instantaneous Ampere-Hour capacity (AH) effectively removed from the battery B1 at any given instant prior to full charge recovery. This implies that after one hour of recharge 63% of the depleted energy has been recovered, while an 80% recovery can be attained within 75 minutes. The magnitude of the charging current decreases exponentially from 100% amplitude at the start of recharge to 37% after one hour of continuous recharge, and 20% after 75 minutes. The charging rate itself can be increased beyond these described limits, and is subject only to temperature rise of the electrolyte, gassing and life cycle of the battery (mostly gassing). It will be appreciated that the controller 21 may be adapted (by means not shown) to regulate the conduction duty cycle of switching means 15 shown in FIG. 2, or switching means 15a and 15b shown in FIG. 3, in accordance with the recharge requirements of B2 as described above. Battery charge is measured in terms of net reduction in battery capacity (AHI) as the result of discharge, and, in accordance with the invention, such information may be stored and continuously updated in the memory. The larger the reduction of available battery capacity ($AH_{B1}$), the larger the magnitude of the initial charging current ($I_{Bi}$). Hence, the conduction duty cycle, ($\Delta$) for either switching means (15a, 15b) shown in FIG. 3 would be:

$$\Delta \approx f(\downarrow I_{B1}) \approx f\downarrow[AH(\text{charged}) - AH(\text{discharge})]$$

Usually the maximum current (I max) is limited by the current capacity of the switching means 15a, 15b, and is substantially equal to the maximum current rating for either switching means 15a or 15b. The micro-computer control system contains a directional sensor for the battery current indicated at 22, to determine whether the battery is charging or discharging. An A/D converter may be utilized to convert sensor 22 information into a digital quantity. The net reduction of battery capacity (AH) may be processed continuously and the program memory may be continuously updated. Another A/D converter may be utilized to monitor the voltage of battery B1 in order to limit the peak voltage applied to the battery. An overcurrent sensor, not shown, also may be utilized in conjunction with the micro-computer to limit the current to a preset amplitude protect the solid state controller.

The conduction duty cycle of the chopper motor controller is regulated by varying the count down of each 16 bit counter/phase control output via the data bus from the micro-computer. Also, the pulse repetition rate of the conduction cycle of the switching means 15a and 15b may be controlled by a voltage controlled oscillator, not shown. In a preferred embodiment, the micro-computer control system serves to adjust the electrolyte bubble rate by virtue of a prior art battery hydrogen pressure and flow sensor, not shown, and thus establishes the rate at which electrolyte density is replenished in the pores of the battery plates or grids.

While the invention has been described with reference to a specific embodiment, it will be apparent to those skilled in the art that various changes and modifications can be made to the specific embodiment shown and described without departing from the spirit and scope of the invention as set forth in the claims.

What is claimed is:

1. An electrical vehicle controller adapted for on-off propulsion of an electric vehicle, said electric vehicle including at least one on-board storage battery having a given voltage rating, at least one on-board dc drive motor having a series field winding and an armature winding, forward, reverse and neutral electric connect-disconnect motor control means, and at least one variable conduction duty cycle switching means, comprising:
   connect-disconnect electric terminals for electrically connecting said vehicle controller across an external charge station storage battery, said charge station storage battery having a voltage rating greater than the voltage rating of said on-board storage battery; and
   mode transfer switching means for electrically connecting said on-board storage battery across said dc drive motor for speed controlled propulsion of said electric vehicle and for electrically connecting said on-board storage battery across said external charge station storage battery when said vehicle controller is connected to said external charge station storage battery through said connect-disconnect electric terminals, in first and second operational modes, respectively, said mode transfer switching means being adapted to electrically connect said armature winding and said series field winding of said dc drive motor in series across said on-board storage battery through said conduction duty cycle switching means in said first operational mode and being adapted to electrically connect said on-board storage battery and said series field winding of said dc drive motor in series across said external charge station storage battery through said conduction duty-cycle switching means and through said connect-disconnect electric terminals in said second operational mode with said motor control means being nonconductive in said second operational mode.

2. An electric vehicle controller as defined in claim 1, wherein the voltage rating of said on-board storage battery is approximately two thirds the voltage rating of said charge station storage battery.

3. An electric vehicle controller as defined in claim 1 wherein said mode transfer switching means includes a solenoid having a winding, said solenoid winding being energized by said external charge station storage battery when said external charge station storage battery is connected to said electric vehicle controller through said connect-disconnect terminals.

4. An electric vehicle controller as defined in claim 3, wherein said mode transfer switching means is in said second operational mode only during the period said solenoid winding is energized.

5. An electric vehicle controller as defined in claim 4 wherein said mode transfer switching means includes at least first, second and third sets of contacts, said first set of contacts being closed and said second and third sets of contacts being open when said mode transfer switching means is in said first operational mode, and said first set of contacts being open and said second and third sets of contacts being closed when said mode transfer switching means is in said second operational mode, said mode transfer switching means normally being in said first operational mode.

* * * * *